US008623249B2

(12) United States Patent
Bader

(10) Patent No.: US 8,623,249 B2
(45) Date of Patent: Jan. 7, 2014

(54) METHOD FOR PRODUCING LEATHER PELLETS AND COMPOUND GRANULES, AND USE THEREOF

(75) Inventor: Thomas Christof Bader, Goeppingen (DE)

(73) Assignee: Bader GmbH & Co. KG, Goeppingen (DE)

( * ) Notice: Subject to any disclaimer, the term of this patent is extended or adjusted under 35 U.S.C. 154(b) by 95 days.

(21) Appl. No.: 13/387,804

(22) PCT Filed: Jul. 26, 2010

(86) PCT No.: PCT/EP2010/060797
§ 371 (c)(1),
(2), (4) Date: Jan. 30, 2012

(87) PCT Pub. No.: WO2011/020680
PCT Pub. Date: Feb. 24, 2011

(65) Prior Publication Data
US 2012/0133071 A1    May 31, 2012

(30) Foreign Application Priority Data
Aug. 18, 2009   (DE) .................. 10 2009 037 792

(51) Int. Cl.
*C08L 89/06*    (2006.01)
(52) U.S. Cl.
USPC .............................. 264/115; 264/118; 524/11
(58) Field of Classification Search
None
See application file for complete search history.

(56) References Cited

U.S. PATENT DOCUMENTS

| 2,148,905 | A | * | 2/1939 | Horowitz | 106/124.61 |
| 4,497,871 | A | * | 2/1985 | Henke | 428/473 |
| 5,534,327 | A |   | 7/1996 | Nishi et al. | |
| 5,624,619 | A | * | 4/1997 | Pelzer | 264/109 |
| 6,264,879 | B1 | * | 7/2001 | Addie et al. | 264/518 |
| 2010/0293814 | A1 | * | 11/2010 | Skaja et al. | 36/25 R |

FOREIGN PATENT DOCUMENTS

| AT | 506 728 | 11/2009 |
| EP | 1 475 413 | 11/2004 |
| WO | WO 2007/121497 | 11/2007 |
| WO | WO 2009/135239 | 11/2009 |

OTHER PUBLICATIONS

H. Domininghaus: "Die Kunststoffe und ihre Eigenschaften", 2005, Springer-Verlag, Berlin, XP002621509, ISBN: 3-450-21410-0, p. 291, 292, 294 (ISR) (With English Translation).
H. Domininghaus: "Die Kunststoffe und ihre Eigenschaften", 1998, Springer-Verlag, Berlin, XP002621392, ISBN: 3-540-62659-X, p. 135, 136 (ISR) (With English Translation).

(Continued)

*Primary Examiner* — Mary F Theisen
(74) *Attorney, Agent, or Firm* — Collard & Roe, P.C.

(57) ABSTRACT

A method for producing leather pellets, and a method for producing compound granules from leather pellets and a polymer material, for use in molded parts or films. The leather pellets are produced through the following steps: Shavings, crust leather remnants and finished leather waste are obtained as waste products in leather production and finished leather processing; the shavings, crust leather remnants and finished leather waste are milled into ground leather stock comprising leather fibers; the ground stock is pressed into leather pellets; and the leather pellets are dried to a residual moisture content of no more than 30% by weight. The leather pellets can be mixed with a polymer material at a ratio of 10-95% by weight and bonded to one another and shaped forming compound granules. The compound granules can be used to produce molded parts by injection molding or films by calendering.

23 Claims, 3 Drawing Sheets

(56) References Cited

OTHER PUBLICATIONS

Figure 1:
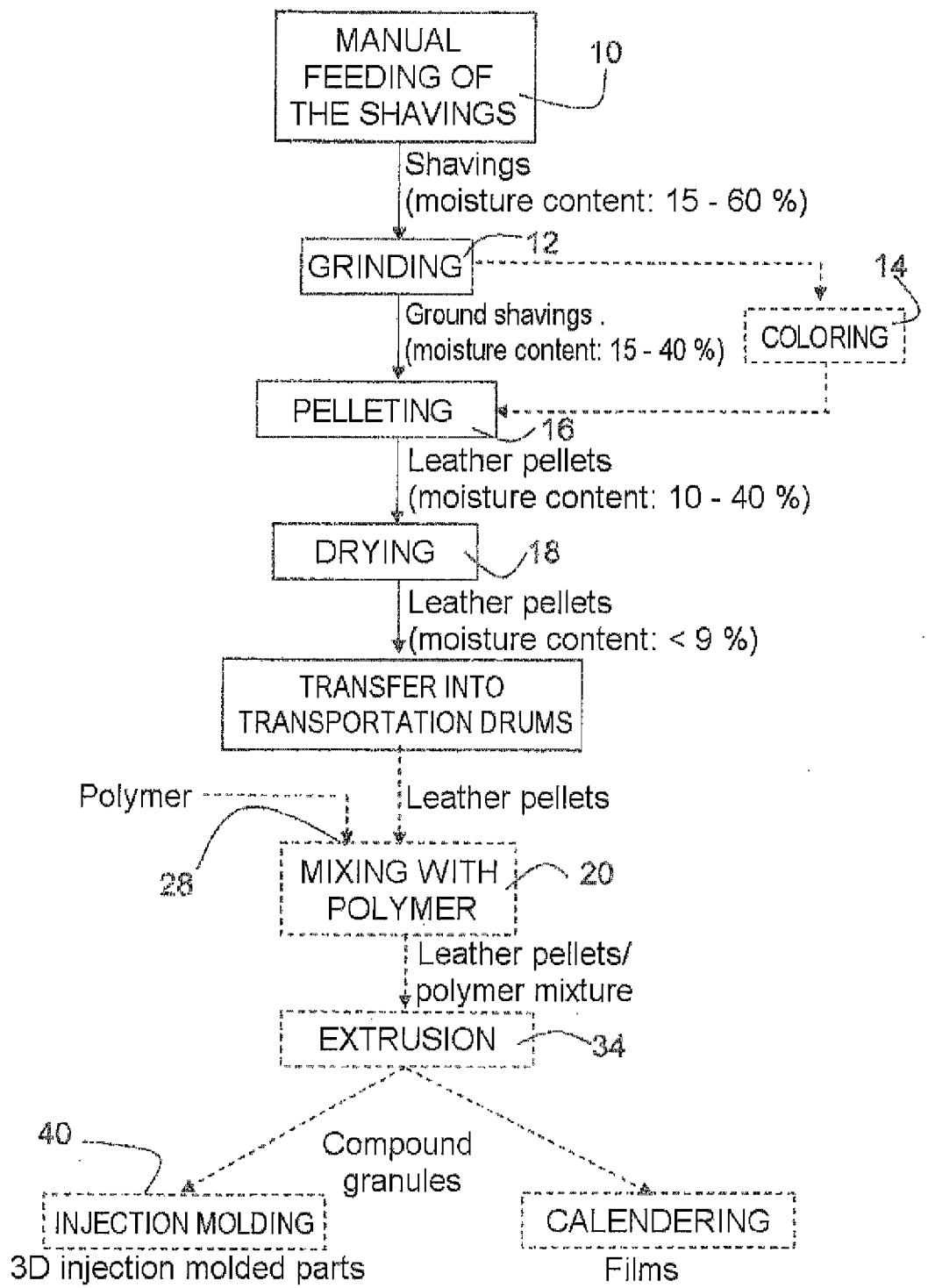

International Search Report of PCT/EP2010/060797, Mar. 11, 2011.
H. Domininghaus: "Die Kunststoffe und ihre Eigenschaften", 2005, Springer-Verlag, Berlin, XP002621509, ISBN: 3-450-21410-0, p. 291, 292, 294 (ISR).
H. Domininghaus: "Die Kunststoffe und ihre Eigenschaften", 1998, Springer-Verlag, Berlin, XP002621392, ISBN: 3-540-62659-X, p. 135, 136 (ISR).

* cited by examiner

METHOD FOR PRODUCING LEATHER PELLETS AND COMPOUND GRANULES, AND USE THEREOF

CROSS-REFERENCE TO RELATED APPLICATIONS

This application is the National Stage of PCT/EP2010/060797 filed on Jul. 26, 2010, which claims priority under 35 U.S.C. §119 of German Application No 10 2009 037 792.1 filed on Aug. 18, 2009, the disclosure of which is incorporated by reference. The international application under PCT article 21(2) was not published in English.

The invention relates to a method for producing leather pellets, a method for producing compound granules of leather pellets and a polymer material and the use of such compound granules for producing molded parts or films.

In the course of industrial leather production, the hides are shaved, i.e. planed off on the reverse by means of a spiral knife cylinder to a uniform thickness, e.g. 1.5 mm, in one of the process steps. The planed-off material is the so-called shavings, which are obtained in an amount of about 33% of the hide weight. Depending on the tanning method, the shavings have been used hitherto either for leather fiber production (chrome shavings) or for composting (chrome-free shavings), and taken to waste dumps. There is also leather waste in the processing of leather, that is to say in the stamping out of leather cuts from tanned leather in the form of a so-called stamped screen, which makes up about 50% of a finished leather hide. Further leather waste is moreover obtained in the trimming and splitting process on crust leathers, that is to say on retanned, stuffed and dyed raw hides. These processes are sometimes also necessary on finished leather hides in order to arrive at a thickness dimension required by the customer.

In all cases, the future routes for utilization and disposal of the leather waste are uncertain and associated with costs.

On the basis of this, the object of the present invention is to develop a method for utilizing leather waste obtained in leather production and the processing of leather.

To achieve the object, the combinations of features described in claims 1 and 3 are proposed. Advantageous embodiments and further developments of the invention emerge from the dependent claims.

The invention is based above all on the concept that the leather waste can be used appropriately and further processed industrially if it is first processed to an intermediate product. This intermediate product acquires the form of leather pellets which are produced by the following steps in the method according to the invention: Shavings are obtained as a waste product in leather production; the shavings are comminuted to a ground leather stock containing leather fibers; the comminuted shavings are pressed to leather pellets; and the leather pellets are dried to a residual moisture content of a maximum of 30 wt. %. In this context, the shavings can be obtained both in a chrome tanning and in a tanning with glutardialdehyde.

On the other hand, leather waste is obtained in the processing of leather both during splitting of crust and finished leather hides and in the form of stamped waste in the stamping out of stamped cuts from finished leather hides; the crust leather remnants and finished leather waste thereby formed are comminuted to a ground leather stock containing leather fibers; the ground leather stock is then pressed to leather pellets. In this context it is to be taken into account that still further additives are present in the finished leather and can lead to a somewhat different processing. Possible additives are, for example, retanning compositions containing stuffing agents, as well as dyestuffs and polyurethanes, which can be at least partly removed before the comminution operation or before the pelleting operation. In these cases also, the leather pellets should be dried to a residual moisture content of less than 30 wt. % after the degreasing or decolorizing operation.

The shavings and crust or finished leather waste are expediently first comminuted to a fiber or particle size of about 0.5 mm by fine grinding. Pressing of the pellets can be carried out in a conventional pelleting press. Depending on the requirements of the subsequent further processing processes, the pressed leather pellets can be dried to a residual moisture content of 5-30 wt. %. For processing in some machine types, a lower residual moisture content is necessary, since these machines would otherwise be exposed to the risk of corrosion by the moisture, while other machine types are less sensitive in this respect.

In contrast to the ground leather stock, the leather pellets are easy to handle as bulk goods, and when packed have a storage stability of months or even years.

The pressed leather pellets are an intermediate product which can be further processed in various ways. In a method according to the invention for further processing of the leather pellets, the pellets are mixed with a thermoplastic polymer material in the ratio of about 10-95% and bonded into compound granules of leather fibers and polymer material. This is carried out in an extruding machine, to which the polymer material and the leather pellets are fed as a premix or separately. During the extruding operation, the mixture of leather pellets and polymer material is homogenized, so that the compound granules are a matrix of polymer material with embedded leather fibers. During the production of the compound granules, a dyestuff can be added to the polymer material, which is conventionally colorless per se, in order to give the granules a desired color. It is also possible in principle for the ground stock to be already colored with conventional leather dyestuffs during production of the leather pellets. However, it has been found that the color stability cannot always be controlled with the necessary precision due to the subsequent drying by heat and other influences. Coloring of the compound granules by addition of dyestuffs to the polymers during the extrusion operation, however, leads to reproducible results.

It is known per se to the person skilled in the art that the leather pellets produced from the ground leather stock as a rule cannot withstand exposure to heat at temperatures above 180° C. because of natural denaturing and, in the presence of oxygen, tend to burn and/or release combustion odors. On the other hand, there is a need for compound granules which can also withstand higher temperatures.

Experiments have shown that, surprisingly, thermoplastic polymer materials having a melting temperature above 180° C. can also be used in the production of the compound granules. In order to be able to employ thermoplastic polymer materials of this type, it is proposed according to the invention that the polymer material formed as a thermoplastic is heated in the molten or softened state to a temperature above 180° C., and that the cold or preheated leather pellets are added to the heated polymer material and mixed with this, while cooling the mixture, before the finished mixture is shaped to form the granules.

In a preferred embodiment of the method according to the invention, the polymer material is heated along a heating zone of an extruder to a peak temperature above 180° C., while melting or softening, the leather pellets are admixed in the cold or preheated state to the polymer material downstream of the heating zone and the finished mixture produced in this way is discharged via an exit die or a die plate at a temperature which is lowered with respect to the heating zone, and is shaped into the compound granules. A thermoplastic polymer material with a melting or softening point above 180° C., preferably above 220° C., is advantageously used for this.

The compound granules produced in this way are a further intermediate product. It comprises granules of a thermoplastic and leather fibers, in which the thermoplastic has a softening point above 150° C., preferably above 180° C.

According to the invention, the compound granules as the intermediate product are preferably used for producing molded parts by means of an injection molding process. Experiments have shown that the compound granules in principle can also be heated to temperatures above 180° C. in the injection molding machine before they are injected into the cavity of the injection molding machine. The relatively high heat stability is presumably to be attributed to the fact that the leather fibers within the compound granules are surrounded by a protective layer which counteracts denaturing of the leather fibers. In addition, the oxygen, which would promote combustion of the leather fibers, is displaced or shielded by the polymer material. An improvement in this respect can also be achieved by a suitable process procedure in which the dwell time in a heating zone of the injection molding machine is minimized.

Molded parts can be produced from the compound granules by means of the injection molding process. Due to the leather content, such molded parts have optical and haptic properties of leather, which make a use for producing molded parts, such as hand grips for tools, Nordic walking sticks, bicycle handlebars, grips on sports equipment and many others of the like, particularly advantageous. This method is likewise particularly suitable for sheathing vehicle steering wheel rims. For such uses where the grip friendliness of leather material was desired, an expensive application of genuine leather hitherto had to be effected. The procedure according to the invention provides an inexpensive and therefore widely applicable alternative here. The compound granules according to the invention are likewise suitable for producing molded parts such as toy figures, since optical and haptic properties which make the figures look more realistic also arise here.

The compound granules are moreover suitable for producing films by calendering. Such films can be employed in all instances where films purely of plastic or genuine leather have hitherto been used.

Figure 2:
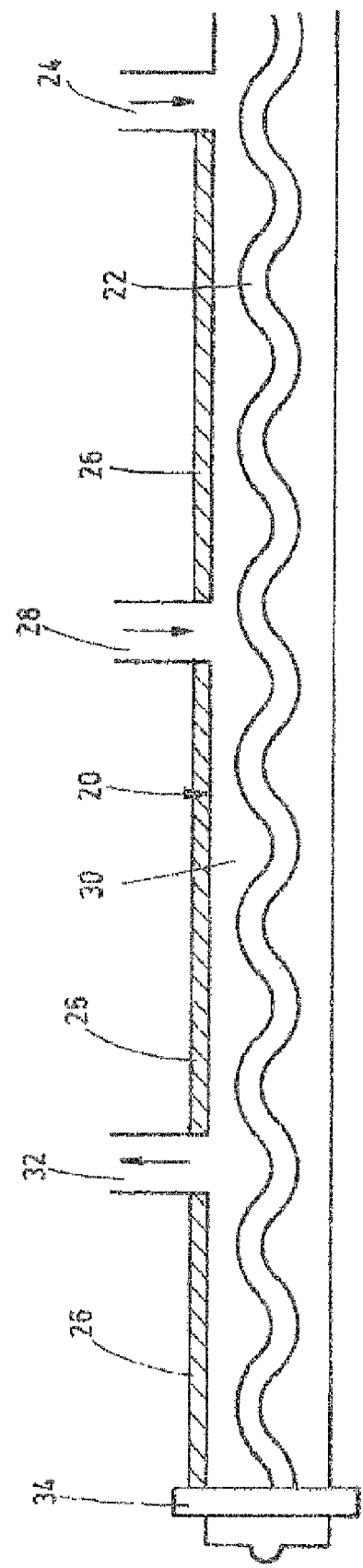
Figure 3:
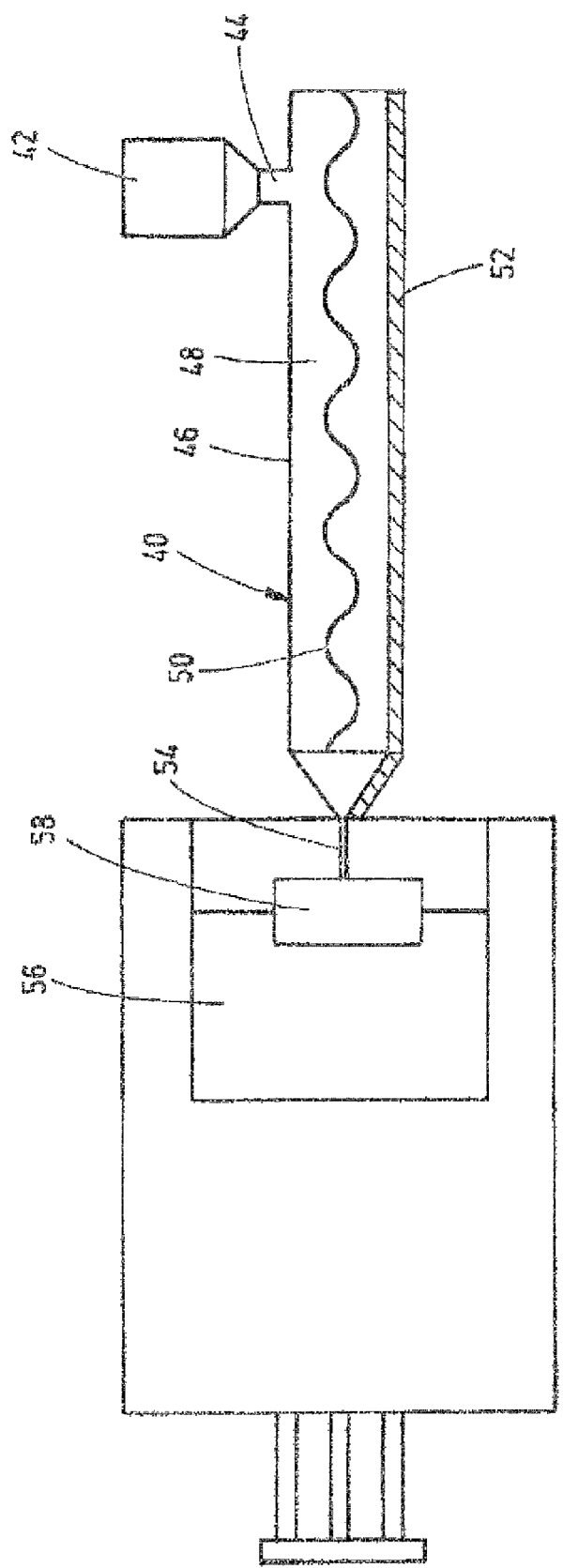

The invention is explained in more detail in the following with the aid of the drawing. The figures show FIG. 1 a block diagram for a method for producing leather pellets, compound granules and injection molded parts using shavings obtained in leather production;

FIG. 2 a section through an extruder for producing compound granules;

FIG. 3 a section through an injection molding machine for producing injection molded parts using compound granules as an intermediate product.

On the basis of the block diagram according to FIG. 1, the shavings obtained in leather production, which have an initial moisture content of 15-60 wt. %, are introduced via a feeding station 10 into a fine mill 12 and ground there to a fiber or particle size of approx. 0.5 mm. After this process step, the shavings can optionally be colored in a universal mixer 14 by addition of a dyestuff. After the grinding, the material has a moisture content of about 15-50 wt. %. The ground shavings are now pressed in a press 16 to give leather pellets. During this procedure, the moisture content decreases further to about 10-40 wt. %. If necessary, this can be followed by a drying operation in a drier 18, until the leather pellets have a residual moisture content of <9 wt. %. The leather pellets produced in this way are transferred as bulk goods into a drum of any desired size. The storage life of such leather pellets is months to years, so that immediate further processing is not necessary.

As an alternative to this, the crust and finished leather waste obtained during the processing of leather can be comminuted in a fine mill to a fiber or particle size of approx. 0.5 mm. The finished leather waste is stamping remnants which are obtained when leather cuts are stamped out of finished leather hides. The ground stock from the crust and finished leather waste can optionally be degreased and decolorized. In a further process step, the ground stock can be colored, for example, in a universal mixer by addition of dyestuffs.

The ground stock is then pressed in a press to give leather pellets. If necessary, this can be followed by a drying operation, until the leather pellets have a residual moisture content of <9 wt. %. The leather pellets produced in this way can likewise be transferred as bulk goods into drums of any desired size.

For further processing, the leather pellets can be further processed to compound granules in plants specifically equipped for this, so-called compounders. For this, the leather pellets are mixed and extruded with a thermoplastic polymer material in an extruder 20 corresponding to FIG. 2. During the extrusion, the polymer material, which is conventionally present as granules, and the leather pellets are led together along a mixing and conveying zone within the extruder by means of conveying screws 22 under the action of pressure and heat. The polymer material fed into the intake zone 24 in the form of granules is first heated along several heating zones 26, and thereby melted. The leather pellets are fed in downstream of the intake zone 24 via a side feed 28 and admixed with the molten polymer material. The compounding takes place along the further conveying zone 30. The leather pellets are finely ground there, so that the extrusion product has an approximately homogeneous distribution of leather fibers in a matrix of plastic. Excess moisture is removed from the melt via the devolatilization opening 32 by means of a vacuum pump. The material mixture ejected in the form of a strand from the extruder 20 through a die plate 34 is in its turn cut off in the desired length and forms the compound granules as the process product.

A dyestuff which determines the color of the compound granules and of the molded parts or films subsequently produced therefrom can be added to the polymer material if this has not already been colored beforehand.

Possible thermoplastic polymer materials are, preferably, polypropylene, polyethylene or thermoplastic elastomers. It has been found that those polymer materials having a melting temperature above 180° C. can also be used in a suitable process procedure. This is surprising inasmuch as according to conventional knowledge, the maximum temperature to which leather can be exposed is about 180° C.

The compound granules produced in this way can in turn be transferred into drums of any desired size and delivered to the end processor, for example the injection molding plant or the film manufacturer.

Processing of the compound granules to molded parts by means of an injection molding process is particularly advantageous, the molded parts produced in this way having optical and haptic properties typical of leather. For this purpose, with an injection molding machine 40 according to FIG. 3, the compound granules are fed via a hopper 42 and an intake 44 to an injection unit 46 in which the granules are ground along a conveying zone 48 by means of a screw 50, heated to the melting temperature in several heating zones 52 and injected via a nozzle 54 into an injection mold 56. The cavity 58 of the injection mold 56 determines the shape and the surface structure of the finished molded part.

Mass products can be produced with a high accuracy in a short time by the injection molding. In this context, the surface of the component can be virtually freely chosen. Smooth surfaces, grain for contact-friendly areas, patterns and engravings can be introduced in the course of the production operation. Parts which are to meet decorative requirements or are intended for manual use, such as grips for tools, tennis racquets, Nordic walking sticks, steering wheel rims for vehicles and the like, are possible for the leather-plastic compound.

On the other hand, the compound granules can be processed by calendaring, in which molten compound granules are led through as a rule several successive heated roll nips and thereby brought to the desired thickness, to give films with a use spectrum which covers that of conventional films of plastic.

Summarizing, the following is to be said: The invention relates to a method for producing leather pellets, a method for producing compound granules of leather pellets and a polymer material and the use of such compound granules for producing molded parts or films. The leather pellets are produced by the following steps: Shavings, crust leather remnants and finished leather waste are obtained as waste products in leather production and the processing of finished leather; the shavings, crust leather remnants and finished leather waste are comminuted to a ground leather stock containing leather fibers; the comminuted stock is pressed to leather pellets; and the leather pellets are dried to a residual moisture content of a maximum of 30 wt. %. The leather pellets can be mixed with a polymer material in a ratio of 10-95 wt. % and bonded to one another to form compound granules as a further intermediate product, and shaped. These compound granules can be used for producing molded parts by means of injection molding or films by means of calendaring.

LIST OF REFERENCE SYMBOLS

10 Feeding station
12 Fine mill
14 Universal mixer
16 Press
18 Drier
20 Extruder
22 Conveying screw
24 Intake zone
26 Heating zones
28 Side feed
30 Conveying zone
32 Devolatilization opening
34 Die plate
40 Injection molding machine
42 Hopper
44 Intake
46 Injection unit
48 Conveying zone
50 Screw
52 Heating zones
54 Nozzle
56 Injection mold
58 Cavity

The invention claimed is:

1. A method for producing leather pellets, in which:
   shavings with an initial moisture content of 50-60 wt. % are obtained as a waste product in leather production,
   the shavings are comminuted to a ground leather stock containing leather fibers,
   the ground leather stock is pressed to leather pellets,
   the leather pellets are dried to a residual moisture content of a maximum of 30 wt. %.

2. The method as claimed in claim 1, wherein the shavings are obtained in a chrome tanning or tanning with glutardialdehyde.

3. A method for producing leather pellets, in which:
   crust leather remnants or finished leather waste are obtained during the processing of leather,
   the crust leather remnants or finished leather waste are comminuted to a ground leather stock containing leather fibers,
   the ground leather stock is pressed to leather pellets.

4. The method as claimed in claim 3, wherein the crust leather remnants are obtained by trimming or splitting crust leather hides.

5. The method as claimed in claim 3, wherein the finished leather waste is obtained in the form of stamped waste by stamping out stamped cuts from finished leather hides.

6. The method as claimed in claim 3, wherein the crust leather remnants or finished leather waste are degreased and/or decolorized before the comminution operation or before the pelleting operation.

7. The method as claimed in claim 6, wherein the leather pellets are dried to a residual moisture content of less than 30 wt. % after the degreasing or decolorizing operation.

8. The method as claimed claim 1, wherein the shavings are comminuted to finished a fiber or particle size of about 0.5 mm.

9. The method as claimed in claim 1, wherein pulverulent dyestuff is added to the ground leather stock in a mixing apparatus.

10. The method as claimed in claim 1, wherein the leather pellets are dried at a temperature of up to 110° C. to a residual moisture content of <9 wt. %.

11. A method for producing granules, in which the leather pellets produced by the method as claimed in claim 1 are mixed and ground with a polymer material in the ratio of 10-95 wt. % and are bonded to one another to form compound granules, and are shaped.

12. The method as claimed in claim 11, wherein a dyestuff is added to the polymer material before the mixing with the leather pellets.

13. The method as claimed in claim 11, wherein the mixture of leather pellets and polymer material is extruded in an extruding machine to give the compound granules.

14. The method as claimed in claim 11, wherein the polymer material formed as a thermoplastic is heated in the molten or softened state to a temperature above 150° C., and in that the leather pellets in the cold or preheated state are added to the heated polymer material and mixed with this, while cooling the mixture, before they are shaped to form the granules.

15. The method as claimed in claim 14, wherein the thermoplastic polymer material is heated to a temperature above 180° C. before the leather pellets are added to the heated polymer material.

16. The method as claimed in claim 11, wherein the polymer material comprising a thermoplastic is heated along a heating zone of an extruder to a temperature above 180° C. while melting or softening, and in that the leather pellets are admixed in the cold or preheated state to the polymer material downstream of the heating zone, and in that the compound mixture produced in this way is discharged via an exit die and is shaped into the compound granules.

17. The method as claimed in claim 14, wherein a thermoplastic polymer material with a melting or softening point above 180° C. is used.

18. Compound granules comprising a mixture of thermoplastic and a ground stock of leather fibers, in which the thermoplastic has a melting point above 150° C.

19. The compound granules as claimed in claim 18, wherein the thermoplastic has a melting point above 180° C.

20. The use of the compound granules as claimed in claim 11 for producing molded parts by means of an injection molding process.

21. The use as claimed in claim 20, wherein the compound granules are heated in the injection molding machine to a temperature above 180° C. before they are injected into an injection mold.

22. The use of the compound granules as claimed in claim 11 for producing films by means of a calendering process.

23. The use as claimed in claim 22, wherein the compound granules are heated to a temperature above 180° C. before they are fed to a calendering zone.

* * * * *